Patented Jan. 29, 1952

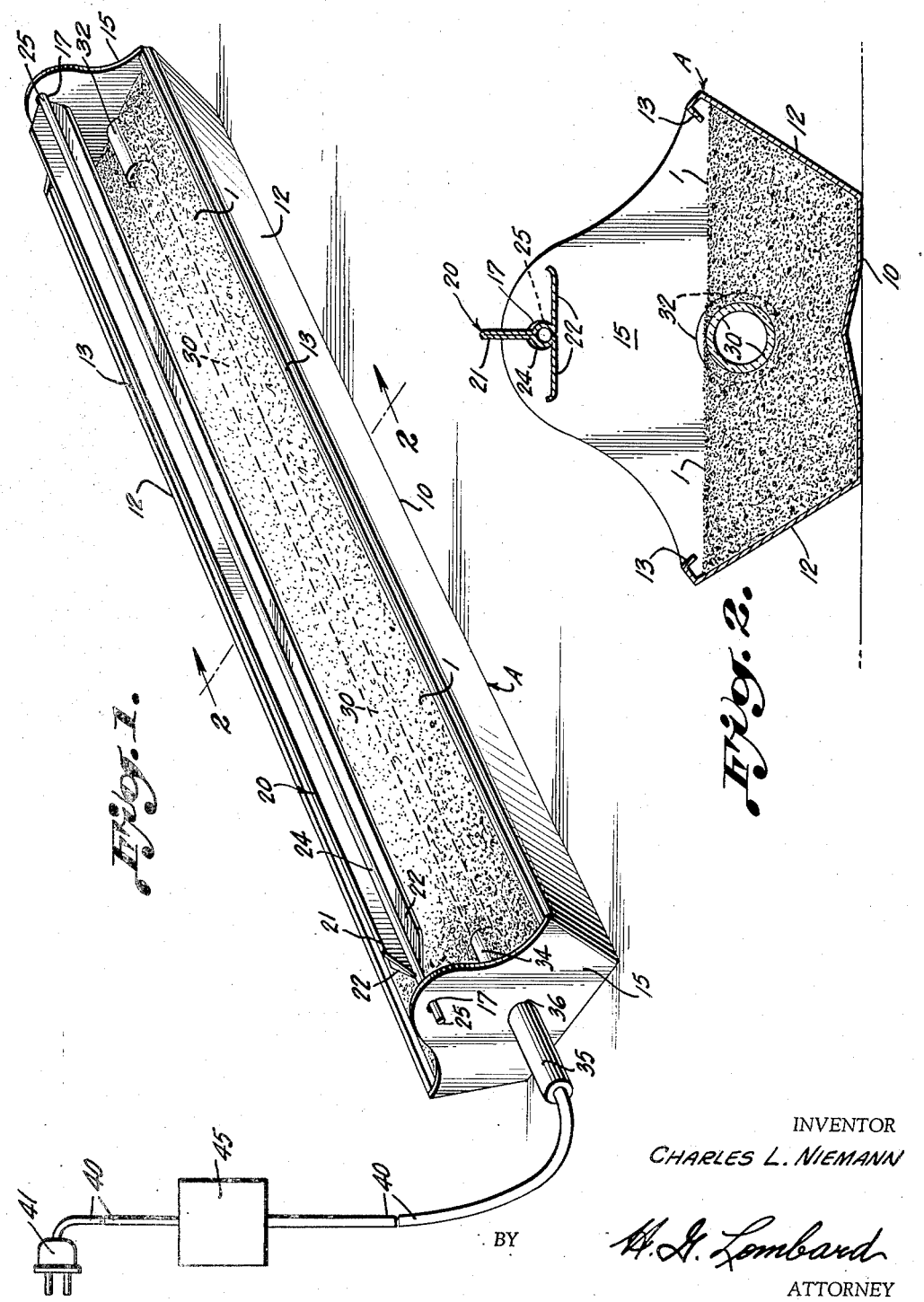

2,583,874

UNITED STATES PATENT OFFICE 2,583,874

POULTRY FEEDING DEVICE

Charles L. Niemann, Westboro, Mo.

Application September 22, 1950, Serial No. 186,281

2 Claims. (Cl. 119—51)

This invention relates in general to feeding devices for poultry, and deals, more particularly, with an improved construction and arrangement for a feeding device which is advantageously used to provide for and increase the food consumption of young turkeys, baby chicks, ducks, geese, etc., thereby minimizing the loss thereof due to starvation and otherwise promoting the faster growth of such poultry.

In the growing of turkeys, for example, there is always the problem of avoiding a heavy loss of the turkey poults by starvation and inadequate food consumption, particularly during the period immediately following their arrival from the hatchery. At the time of hatching, baby turkeys have a poor and limited vision and usually are stupid and rather stubborn such that it is quite difficult to make them eat sufficiently to avoid starvation and otherwise have a normal or above average rate of growth.

It has been found that turkey poults, baby chicks, etc. will pick at bright and shiny objects which attract their attention and when a feeding device is provided with such bright and shiny objects, the poults will pick at the same in a manner whereby they receive in their beaks quantities of feed that provides them with adequate food consumption eliminating much of the loss which would otherwise be suffered due to starvation and inadequate food consumption.

A primary object of the invention, accordingly, is to provide a poultry feeding device, such as described, in which the bright and shiny objects for attracting the attention of the turkey poults, baby chicks, etc., for the purposes aforesaid, is provided by means of a light included in the feeding device, and which light preferably is of the character of a cold light or a light without heat such as provided by an electric lamp containing neon gas or other gas or vapor which produces a bright and gleaming light without radiating heat.

A further object of the invention is to provide a feeding device of this character which comprises a cold light, as and for the purposes set forth in the foregoing, and in which such a light is provided in the feeding device together with the feed at substantially the feed level of the feeding device.

Another, more specific object of the invention is to provide a poultry feeding device of the character described which comprises an elongate feeding trough together with an electric lamp in the form of a neon tube, or the like, extending lengthwise of the feeding trough and mounted therein in a manner whereby the trough may be filled with feed around and slightly over the neon tube such that there is provided a bright and gleaming light in and through the feed along the length of the feeding trough.

Further objects and advantages and other new and useful features in the construction, arrangement and general combination of parts of the invention will be apparent as the following description proceeds with reference to the accompanying drawings in which like reference characters designate like parts throughout, and in which:

Fig. 1 is a perspective of a poultry feeding device in accordance with the invention, as provided in the form of an elongate feeding trough having an electric lamp such as a neon tube, or the like, mounted in longitudinal relation within the feeding trough; and Fig. 2 is an enlarged cross-sectional view of the feeding trough shown in Fig. 1, as seen along line 2—2, looking in the direction of the arrows.

While the poultry feeding device of the present invention is shown in the drawings and described with reference to the provision thereof in the form of a feeding trough for use by turkey poults, baby chicks, etc., it will be appreciated that the invention is not in any way limited to such a construction or use but rather is readily adaptable to other forms of similar and related poultry feeding devices.

In the present example, the feeding device is shown provided as a feeding trough for feeding turkey poults or baby chicks during the first three weeks or so after they are hatched, and longer if desired, as, for example, in the broiler industry, etc. During this period, the improved feeding device serves to promote and speed the growth of the turkey poults and otherwise minimizes and eliminates much of the loss of the turkey poults due to starvation and inadequate food consumption, as aforesaid. A further advantage resides in the fact that the feeding device eliminates cannibalism to an important extent inasmuch as the poults, chicks or other birds are so fascinated by the bright and gleaming light withing the feeding device that they are usually occupied in picking at the light and thus are quiet and content with little tendency toward cannibalism.

Referring now, more particularly, to the drawings, Fig. 1 illustrates an example of a poultry feeding device in accordance with the invention as provided in the form of a feeding trough, designated generally A.

Such a feeding trough A may be provided in any suitable construction in the manner of an elongate receptacle comprising a bottom 10, side walls 12, and end walls 15 joining said bottom and side walls at each end of the trough. In the present example, the side walls 12 are shown as formed preferably with return bent flanges 13 defining beads serving to reinforce and stiffen said side walls 12. The end walls 15 include extensions on their upper portions which are provided with holes 17 for supporting a rotatable anti-roosting rod 20 extending longitudinally over the trough A. The use of the anti-roosting rod 20 is optional and in the present example, as best seen in Figure 2, the same is provided by a suitable length of sheet metal bent upon itself to define a fin 21 carrying outwardly bent fins 22 all extending radially from a central spindle portion 24. The spindle 24 terminates in projections 25 at each end defining pivots which are received in the holes 17 in the end walls 15 of the trough A to rotatably support said anti-roosting rod 20 in the completed feeding device.

Within the trough A, there is mounted a neon tube lamp 30 extending longitudinally through the approximate middle of the trough and preferably slightly below the feed level of the trough. The lamp 30 may be provided in any suitable manner by means of a tube containing neon, argon, helium or other gas or vapor adapted to provide a cold light, or a light without heat, as distinguished from a hot light such as provided by an incandescent lamp or fluorescent lamp, for example. It has been found that best results are obtained in the use of a cold light, as aforesaid, inasmuch as a hot light is produced together with radiated heat which seems to be considerably less fascinating and attractive to the turkey poults or baby chicks.

The preferred cold light included in the feeding device by the neon tube lamp 30 may be provided in any desired color and in any modified or equivalent arrangement as, for example, by two or more similar tube lamps extending in spaced relation through the longitudinal middle of the trough A.

The neon tube lamp 30 may be mounted in the trough A in any suitable way in the manner aforesaid, and, in the present example, said tube lamp is shown supported at its ends in suitable tube sockets 32, 34, secured to the respective end walls 15 of the trough A. Preferably these sockets 32, 34, are such as to provide a removable mounting of the neon tube 30 for easily replacing the same whenever necessary. The socket 32 mounting one end of said tube lamp 30 is secured in any suitable manner to the adjacent end wall 15 of the trough A while the other socket 34 is provided in conjunction with an insulator sleeve or tubular bushing 35 which extends through an opening 36 in the adjacent end wall 15 of the trough A and is suitably secured in said passage 36 to mount the associated end of said tube lamp 30.

The socket 34 on the inner end of said bushing 35 includes an electrical contact (not shown) in connection with an electrical wire 40 extending through said bushing 35 and beyond the outer end thereof for any required length. The electrical wire 40 is provided with the usual plug 41 for connection to an electrical outlet together with a suitable transformer 45 adapted to be mounted on a wall or other location where it is not accessible to the turkey poults or baby chicks and presents no danger thereto when the wire 40 is connected to the source of electricity.

In the use of the feeding device of the present invention, it will be understood from the foregoing that the trough A is filled with feed 1 in the usual manner slightly above the height of the tube lamp 30 and preferably with the feed so scattered as to leave small portions of said tube lamp 30 exposed and visible. In any event, when the tube lamp 30 is connected with electricity through the electrical wire 40 and transformer 45, said tube lamp 30 provides a pronounced light which glows with such brilliance as to be clearly visible in and through the feed 1 in a manner whereby it provides a number of bright and shiny spots at the feed level along the length of the trough A and particularly where any portion of said tube 30 is exposed.

The light provided by the tube lamp 30 glows with such brilliance that the turkey poults or baby chicks are necessarily attracted thereto and naturally pick at the same with their beaks in their usual way of picking at bright and shiny objects. In so picking at the light provided by the tube lamp 30, the turkey poults receive in their beaks particles of feed which they eat and continue to pick and eat in a similar manner until the entire length of the tube lamp 30 is uncovered, and usually until all the feed in the trough A is exhausted. The trough A is then refilled with feed and the feeding device put to use in a repetition of the foregoing described procedure.

While the invention has beeen described in detail with a specific example such example is intended as an illustration only inasmuch as it will be apparent that various modifications in the construction, arrangement and general combination of parts of the invention may be provided without departing from the spirit and scope of the invention. The present embodiment is therefore to be considered in all respects as illustrative and not restrictive, the scope of the invention being indicated by the appended claims rather than by the foregoing description, with all changes falling within the scope, meaning, and range of equivalency of the claims intended to be embraced therein.

What is claimed and desired to be secured by United States Letters Patent is:

1. A poultry feeding device comprising an elongate trough having side and end walls defining a receptacle for containing feed, a substantially cylindrical tube lamp in said trough extending lengthwise approximately along the longitudinal middle of said trough with its top portion slightly below the normal feed level in said trough, means at each end of said trough in operative engagement with each end of said tube for supporting said lamp within the trough, and an electrical wire connected to lamp for supplying electrical current to said lamp.

2. A poultry feeding device in accordance with claim 1 wherein said lamp is of a type which produces cold light.

CHARLES L. NIEMANN.

REFERENCES CITED

The following references are of record in the file of this patent:

UNITED STATES PATENTS

| Number | Name | Date |
|---|---|---|
| 1,793,431 | Pelmulder | Feb. 17, 1931 |